(12) United States Patent
Ostrover (10) Patent No.: US 7,231,131 B2
(45) Date of Patent: Jun. 12, 2007

(54) APPARATUS FOR GENERATING CONTENT CODES FOR AUDIOVISUAL PROGRAMS BY MULTIPLE VIEWERS

(75) Inventor: Lewis S. Ostrover, Los Angeles, CA (US)

(73) Assignee: Warner Bros. Home Entertainment Inc., Burbank, CA (US)

( * ) Notice: Subject to any disclaimer, the term of this patent is extended or adjusted under 35 U.S.C. 154(b) by 1450 days.

(21) Appl. No.: 09/921,420

(22) Filed: Aug. 2, 2001

(65) Prior Publication Data

US 2003/0026593 A1     Feb. 6, 2003

(51) Int. Cl.
*H04N 5/93*   (2006.01)
*H04N 7/00*   (2006.01)
*H04N 7/16*   (2006.01)

(52) U.S. Cl. ............................. 386/55; 386/52; 386/46

(58) Field of Classification Search .................. 386/54, 386/55, 52, 46, 68, 14; 725/28, 25, 20
See application file for complete search history.

(56) References Cited

U.S. PATENT DOCUMENTS

| | | |
|---|---|---|
| 3,947,669 A | 3/1976 | Simmons et al. |
| 4,368,961 A | 1/1983 | Mattes |
| 4,489,316 A | 12/1984 | MacQuivey |
| 4,501,478 A | 2/1985 | Mattes |
| 4,774,600 A | 9/1988 | Baumeister |
| 4,931,879 A | 6/1990 | Koga et al. |
| 5,097,465 A | 3/1992 | Funabashi et al. |
| 5,122,886 A * | 6/1992 | Tanaka ........................ 386/104 |
| 5,172,111 A | 12/1992 | Olivo et al. |
| 5,311,497 A | 5/1994 | Takizawa et al. |
| 5,406,534 A | 4/1995 | Hisakado et al. |
| 5,459,517 A | 10/1995 | Kunitake et al. |
| 5,589,945 A | 12/1996 | Abecassis |
| 5,621,713 A | 4/1997 | Sato |
| 5,661,844 A | 8/1997 | Park |

(Continued)

FOREIGN PATENT DOCUMENTS

JP     11007669     12/1990

(Continued)

OTHER PUBLICATIONS

International Search Report dated Dec. 12, 2002; PCT/US02/23709 filed Jul. 25, 2002; entitled Apparatus for Generating Content Codes for Audiovisual Programs by Multiple Viewers; inventor Ostrover Lewis S.

*Primary Examiner*—Robert Chevalier
(74) *Attorney, Agent, or Firm*—Gottlieb, Rackman & Reisman, P.C.

(57) ABSTRACT

An apparatus for generating content codes for the scenes of a program includes a scene detector that detects the start of new scene, and a selector that allows a group of viewers to enter or select one or more content codes for the scene, the content codes being related to the audio and visual contents of the scene. The content code(s) and data identifying the scene are then stored for later use. The apparatus also includes a new scene indicator that is activated when a new scene is detected and is then deactivated after content code(s) have been inputted for the scene. Content codes may also be obtained from a set of viewers with a single content code being generated based on the entire set.

55 Claims, 4 Drawing Sheets

U.S. PATENT DOCUMENTS

| | | | |
|---|---|---|---|
| 5,734,444 A | 3/1998 | Yoshinobu | |
| 5,758,026 A | 5/1998 | Lobley et al. | |
| 5,760,767 A | 6/1998 | Shore | |
| 5,892,536 A | 4/1999 | Logan et al. | |
| 5,913,013 A | 6/1999 | Abecassis et al. | |
| 5,950,172 A | 9/1999 | Klingman | |
| 5,986,692 A | 11/1999 | Logan et al. | |
| 5,987,211 A | 11/1999 | Abecassis | |
| 6,038,367 A | 3/2000 | Abecassis | |
| 6,091,886 A | 7/2000 | Abecassis | |
| 6,208,805 B1 | 3/2001 | Abecassis | |
| 6,236,801 B1 | 5/2001 | Engle | |
| 6,351,596 B1 | 2/2002 | Ostrover | |
| 6,411,771 B1 | 6/2002 | Aotake | |
| 6,618,341 B1 | 9/2003 | Yamashita | |
| 6,704,029 B1 | 3/2004 | Ikeda et al. | |
| 2001/0008510 A1 | 7/2001 | Nakayama et al. | |
| 2003/0063549 A1 | 4/2003 | Kato et al. | |
| 2003/0123338 A1 | 7/2003 | Revis | |
| 2004/0128681 A1* | 7/2004 | Hancock et al. | 725/30 |
| 2005/0028191 A1* | 2/2005 | Sullivan et al. | 725/28 |

FOREIGN PATENT DOCUMENTS

| | | |
|---|---|---|
| JP | 08-018923 | 1/1996 |
| JP | 10021633 A | 1/1998 |
| JP | 11-238071 | 8/1999 |
| JP | 2001-043630 | 2/2001 |
| JP | 2001-197431 | 7/2001 |
| WO | WO 00/ 04726 | 1/2000 |

\* cited by examiner

APPARATUS FOR GENERATING CONTENT CODES FOR AUDIOVISUAL PROGRAMS BY MULTIPLE VIEWERS

RELATED APPLICATIONS

The subject matter of this application is related to commonly owned application Ser. No. 09/921,044, filed Aug. 2, 2001, and entitled APPARATUS FOR GENERATING CONTENT CODES FOR AUDIOVISUAL PROGRAMS, incorporated herein by reference.

BACKGROUND OF THE INVENTION

A. Field of Invention

This invention relates to the tagging of audiovisual content of a program, such as analog or digital motion pictures that are transmitted over cable, or video transmitted over the Internet. More particularly, it pertains to an apparatus for tagging individual scenes of the audiovisual program by several people so that it can later be replayed with selected scenes being omitted or replaced by others.

B. Description of the Prior Art

Presently, many video programs have ratings that can be used by viewers to determine whether they would like to play the programs, or whether they would allow others (such as children or adolescents) to play them. These types of ratings are also becoming available for TV shows, games, and other audiovisual programs. Programs broadcast over the Internet may be filtered or otherwise restricted using on-line filtering services, and set-top boxes and TVs with V-CHIP content filtering technology also exist for this purpose.

As an improvement to current technology, it has been suggested that rating codes be provided for individual segments, or scenes, of programs. Automated playing devices would then be able to seamlessly eliminate segments with objectionable content, and/or substitute other segments with acceptable content if such segments are available. Commonly assigned copending application Ser. No. 09/479,819 filed Jan. 7, 2000, entitled "Content Control of Broadcast Programs" and incorporated herein by reference, discloses a personal video recorder that receives and stores a broadcast program with each scene being tagged with a content rating. A viewer designates parameters for acceptability of content, and the appropriate scenes are played as a seamless continuous program. U.S. Pat. Nos. 5,987,211 and 6,208,805 to Abecassis discloses an apparatus that records a program on a disk and filters content according to viewer preferences. A viewer is shown only the segments having acceptable content. A parent has the ability to review a program and tag unacceptable scenes. The apparatus then omits the unacceptable scenes when the program is played.

A major disadvantage of all of these systems is that, whether a universal rating is assigned to a whole program, or ratings are assigned to each of a program's individual scenes, the ratings still reflect a limited number of categories accepted by the public at large, industry-wide guidelines or the opinions of an editor. Thus, they fail to reflect inherent differences in the filtering categories of individual customers due to many factors such as geographic location, level of education, income, religious and moral beliefs, etc., factors that meaningfully affect a person's views and preferences for what kind of programs and content they, or their children, should view.

A further disadvantage of prior art systems is that typically a single person provides the content codes. Therefore, the content codes selected by that one person reflects his/her scene characterizations that may or may not match the characterizations of others. What may be a "violent" scene to one person may not be such a scene to another.

OBJECTIVES AND SUMMARY OF THE INVENTION

It is believed to be beneficial to allow a group of viewers to tag programs based on composite characterizations of scenes.

Accordingly, it is an objective of the present invention to provide an apparatus that permits viewing of scenes of a program, and the tagging of scenes by a group of viewers with content codes that can be used later for discriminating purposes.

A further objective is to provide an apparatus that is user-friendly and easy to operate.

A further objective is to provide an apparatus in which a program's scenes can be designated by the program provider, automatically detected, or designated by a viewer.

Briefly, viewers display a program on an audiovisual monitoring station system. The apparatus for assigning content codes to the program's scenes constructed in accordance with this invention includes a scene detector identifying the individual scenes of a program. The scene detector, in one embodiment, detects scene changes by analyzing the characteristics of sequential frames using known techniques. In another embodiment, the program itself includes codes that identify its scenes. In a third embodiment, the scene detector responds to a scene selector that is viewer activated.

Also included in this invention is a scene indicator, which may be in the form of a visual or audible signal, and which indicates the beginning of a new scene. Viewers in a group are prompted by the scene indicator to enter respective individual content codes for the new scene. This content code is determined by the viewers based on the visual as well as the audio content of the respective scene. Once the individual content codes are entered by all the viewers, the scene indicator is deactivated until the detection of the next scene. Alternately, the scene indicator may be activated only for a brief period of time. A timer may also be provided to indicate the time left until the end of the scene (if known). If a viewer enters no content code by the end of the scene, a default value is automatically assigned for that scene for that viewer. The default value may be the individual content code for the immediately preceding scene.

A code selector is also included in the apparatus for each viewer. This code selector is adapted to receive the individual content codes for a scene. An algorithm is used to determine a final content code based on the individual content codes. For example, the content code representing the most objectionable content may be selected as the final content code. Alternatively, a straight arithmetic or weighted averaging method may be used to determine the final content code (where the codes are ranked in a predetermined order). This voting approach allows a committee of parents, for example, to code a program for a class of students in the least objectionable way, based on both the visual and audio contents of each scene. Of course content codes may be designated based on a variety of criteria independently of whether a scene may be objectionable or not.

For each scene, a two-component code (two record fields) is generated which includes the final content code and an identification of the scene. The scene identification may be generated by a timer that times the duration of each scene as well as previous scenes and then generates a starting and ending time for the scene.

The apparatus also includes a memory for storing the codes for all the scenes including the assigned content codes and scene identifications.

The apparatus further includes a controller adapted to selectively activate the scene indicator and generally manage the generation and storage of the scene codes.

In this manner several viewers can view a program simultaneously and select the content codes for each scene, as described. Alternatively, the viewers can view the program separately and independently of each other. The individual content codes are logged and the final content codes are determined any time after the last viewer has made his selections.

DETAILED DESCRIPTION OF THE INVENTION

Figure 1:
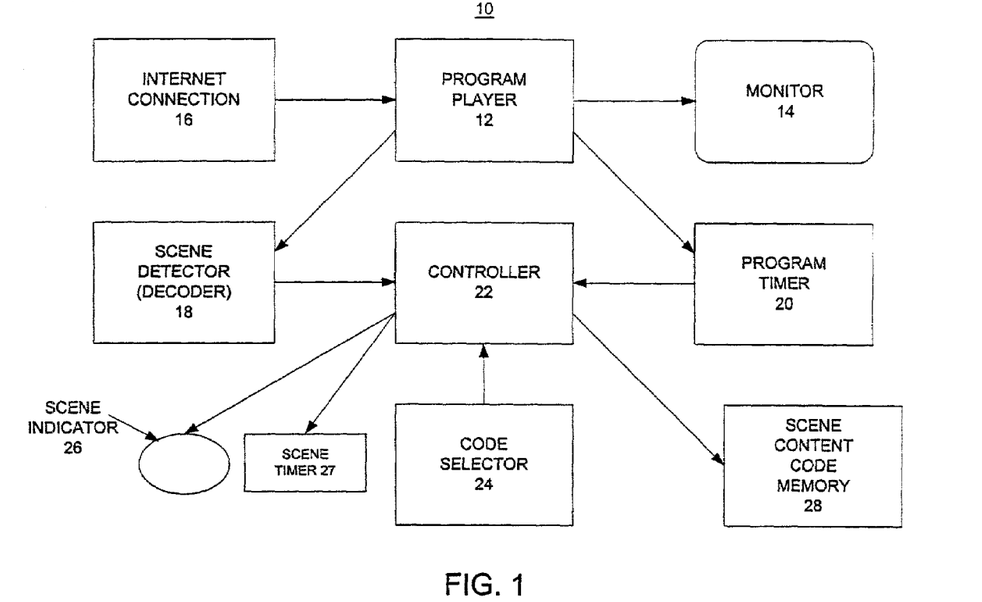
FIG. 1 shows a block diagram of an apparatus for assigning content codes to scenes by a single viewer.

An apparatus for generating a content code by a single viewer is described in the above-identified co-pending patent application Ser. No. 09/921,044. In order to provide a better understanding of the present invention, this apparatus is first described herein in conjunction with FIGS. 1–3. The apparatus 10, as shown in FIG. 1 includes a device such as a program player 12 that is adapted to play an audiovisual program on a monitor 14. The program could be recorded on a DVD disk, a VCR tape or other similar media, or in a personal video recorder receiving the program from a program source 16, e.g. through a cable, XDSL, or satellite connector.

Associated with the player 12 are a scene detector 18 and a program timer 20. The scene detector 18 is used to detect scenes in the program signal generated by player 12. The program timer 20 generates a count that can be used to provide unique identifications for the scenes of the program. Instead of the timer, other scene identification means may be used, such as a frame counter.

A controller 22 directs the operation of the apparatus 10. The controller 22 is coupled to the scene detector 18 and timer 20, and it is also associated with a code selector 24, a scene indicator 26, scene timer 27 and a memory 28. It should be understood that all the elements in FIG. 1 can be implemented as a microprocessor-based device such as a PC, or can be incorporated into the program player 12 (especially if the player is a personal video recorder). However the apparatus 10 is shown in FIG. 1 as having discrete components for the sake of clarity.

Figure 2:
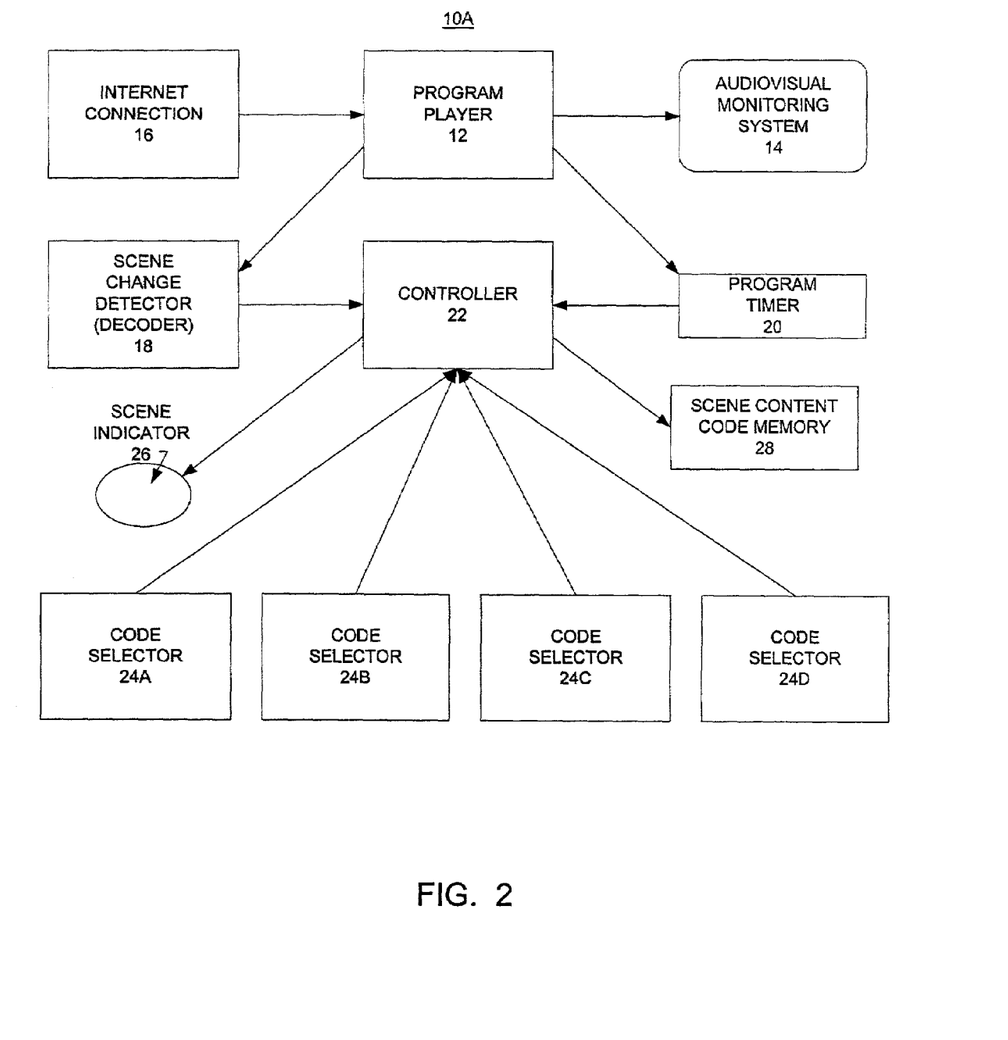
FIG. 2 shows a block diagram of the apparatus of FIG. 1 modified to accept code selections from several viewers simultaneously.

In the present invention, the apparatus of FIG. 1 is modified to allow several viewers to provide content codes for each scene of a program. The modified apparatus 10A is shown in FIG. 2. As can be seen in this Figure, the apparatus 10A differs from the apparatus 10 in FIG. 1 in that it is provided with several code selectors, such 24A–24D. (FIG. 2 shows four selectors; however, any number of selectors may be used.). Therefore, with this apparatus several viewers decide the code that is to be assigned to each scene based on its audio and visual contents. Each viewer operates one of the selectors.

Figure 3:
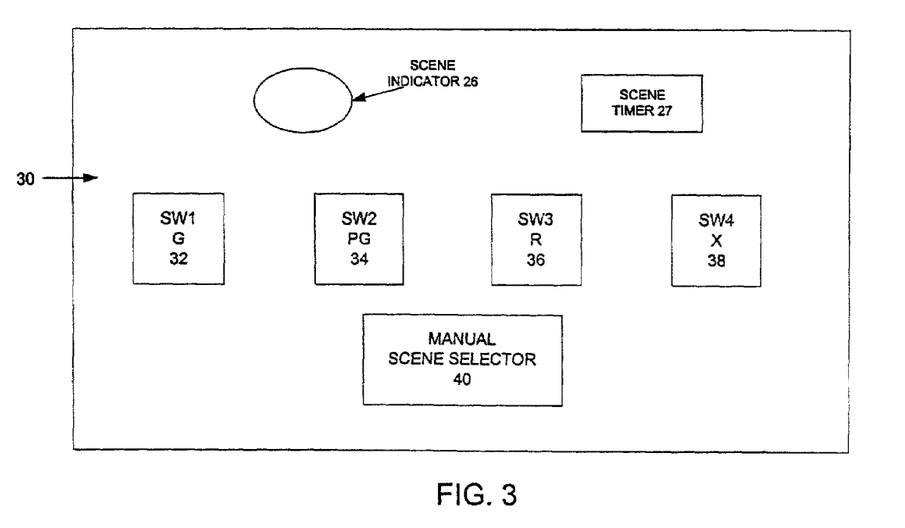
FIG. 3 shows a somewhat diagrammatic view of a selector panel on which a viewer can enter his preferences.

Details of one of the code selectors 24A are shown in FIG. 3. The code selector 24A consists of a housing 30 that supports a plurality of switches 32, 34, 36 and 38. Each of the switches may be labeled with a content code, for example G, PG, R or X. (More precise content codes may be used, giving rise to more than just four switches. For example, content codes may be provided which describe more accurately the contents of the scenes, in terms of the amount or degree of sex, violence, nudity, profanity, etc.) Each of the switches 32–38 may be a momentary pushbutton switch. The scene indicator 26 may be positioned on the housing 30 as well.

Figure 4:
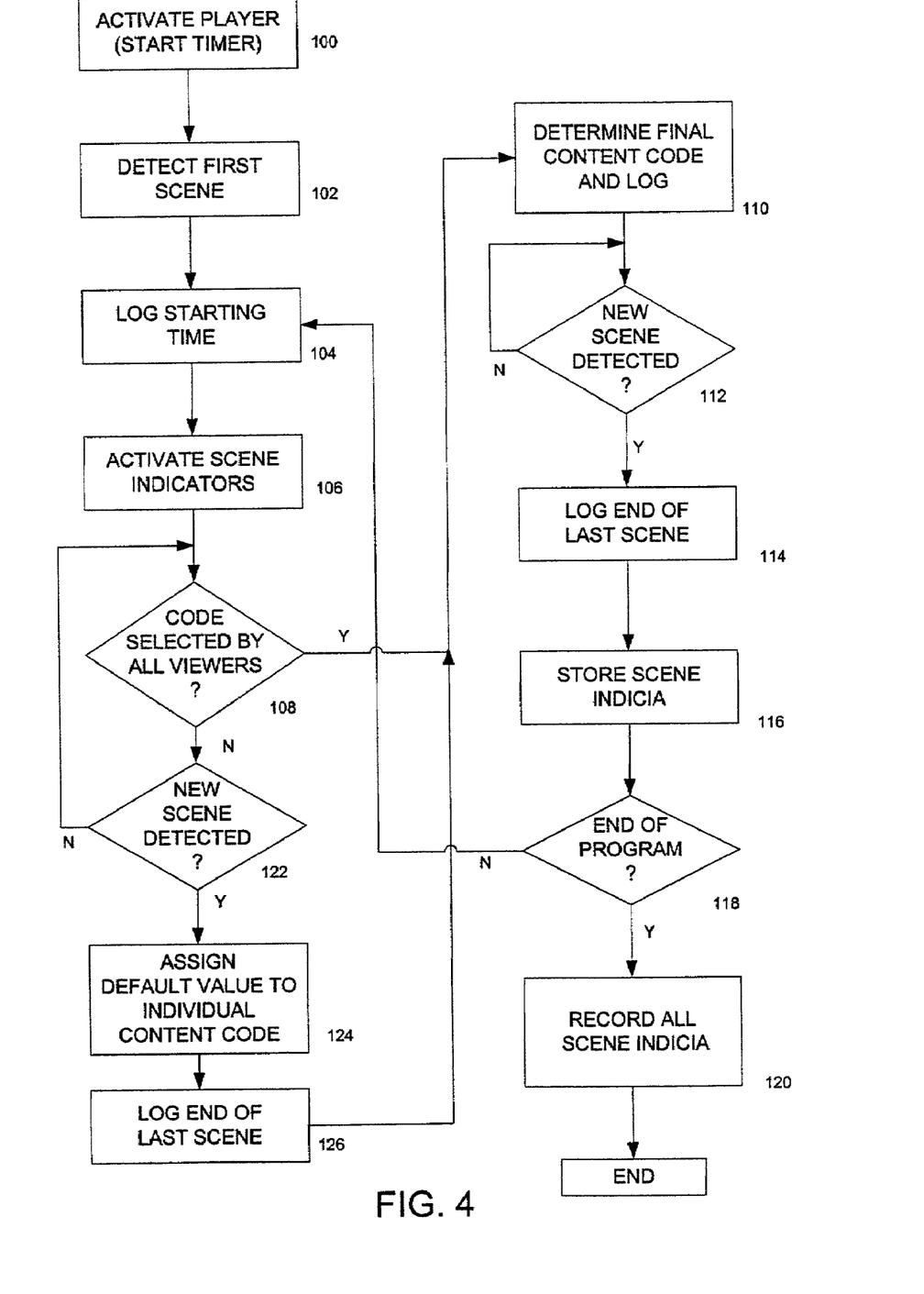
FIG. 4 shows a flow chart for the operation of the apparatus of FIG. 2.

The apparatus of FIGS. 2 and 3 operates as indicated by the flow chart of FIG. 4. In step 100 the program player is activated to start playing a program on audiovisual monitoring system 14. The program timer 20 is activated as well. The monitoring system 14 is arranged to allow all the viewers to see and hear the program.

As the program is shown to the viewers, the frames forming the program are monitored by scene detector 18 to detect the start of scenes that comprise the program. Scene detectors of this kind are well known in the art. When the first scene is detected (step 102), the controller 22 logs its starting time as indicated by program timer 20 (step 104).

Next, the scene indicators 26 are activated on each code selector 24A–24D (step 106). Each scene indicator 26 may be a simple light that is turned on or a beeper that is activated. The scene indicators 26 are activated to prompt each viewer for a content code, using the respective code selector 24A–24D.

In some instances, the scene detector 18 may be too sensitive for the purposes of the present invention. More particularly, the scene detector may designate every camera angle change as a new scene. Therefore, it may be advisable to have one of the viewers determine the start and end time of each scene. For this purpose, one of the code selectors, for example, the code selector 24A of FIG. 3, may include a manual scene selector 40. The manual scene selector 40 may be a momentary pushbutton like switches 32–38. When this manual scene selector 40 is provided, the scene detector 18 can be turned off or omitted.

In such an embodiment, after the program starts, the viewer associated with code selector 24A selects the start time of a scene by activating the manual scene selector 40. When the manual scene selector 40 is activated, the scene indicators 26 for each code selector 24A–24D are also activated, thereby indicating that the current scene has not yet been assigned a content code by the respective viewers. The start time is also logged.

As discussed above, as each scene is displayed on audiovisual monitoring system 14 with audio heard through associated speakers (not shown), the scene indicators 26 are activated. As the viewers view and listen to the current scene they each make a determination of what its content code should be. They then designate for the scene their selected content code by activating the appropriate switch 32–38. (It is possible to activate multiple switches if the system accommodates multiple content codes for a scene.) As each viewer selects his or her individual content code, the scene indicator on the respective code selector 24A–24D is turned off. (Alternatively, If the scene indicator 26 is a beeper, it may emit a different sound than when it was activated in step 106). In an alternative embodiment, the scene indictor 26 may be turned on or activated only for a brief period (e.g., three—ten seconds). In this embodiment, the scene indictor 26 is deactivated independently of the selection of a content code by the viewer. The individual content codes are stored in memory 28.

Returning to FIG. 4, in step 108 the controller 22 checks if all the viewers have selected individual content codes. If content codes have been selected by all viewers, then in step 110 the final content code is determined from the individual content codes using a predetermined algorithm as described above. This final content code is then logged together with a corresponding scene identification, e.g., its starting time code.

In step 112 the controller 22 checks the scene detector 18 for a new scene. When a new scene is detected, the controller 22 logs the end (e.g., another time code) of the last scene (step 114).

Next, in step 116 scene indicia, including the appropriate final content code(s) and the corresponding scene identification data, are stored in scene content code memory 28.

In step 118 a test is performed to determine if the end of the program has been reached. If the program end has not been reached, then the start time of the new scene is logged in step 104 and the new scene is processed as discussed above.

In step 118 if the program end is detected, then in step 120 all the scene indicia are recorded in a specific file that may be left in memory 28, stored on the medium which itself contains the program, or somewhere else.

Back at step 108, if a content code has not been selected yet for the current scene by at least one of the viewers, then in step 122 the controller 22 checks the scene detector 18 for a new scene. If a new scene is not detected, then the system 22 goes back to step 108. If a new scene is detected in step 122, then in step 124 a default value is assigned for the individual content code of the respective viewer(s). For example, the default code may be the code assigned by the respective viewer to the previous scene.

In step 126 the end of the scene being processed is logged and the process continues with step 116.

The apparatus 10 can be modified for other types of operation as well. In one embodiment the scenes may be already defined by a specific code embedded within the program itself. In this case, instead of a scene detector, a decoder detects the beginning and end of each scene. This alternative is indicated in FIG. 1 for element 18.

If the beginning and end points of a scene (and therefore its duration) are known, then, at the beginning of each scene, a scene timer 27 may also be activated. This scene timer 27 can be configured to count down and indicate to a viewer how much time is left to the end of the scene (i.e., the time left before the viewer has to select a code).

Instead of using an automatic or even manually operated scene detector, it is possible simply to allow the viewers to enter content codes at any time. Any change in content codes would in effect signal a new scene. The advantage of identifying the start of a real scene, however, is that the entered content codes are retroactive to the start of the scene. On replay, an appropriate player could curtail viewing of an objectionable scene from its start, not just from when the content codes were entered.

This voting approach allows a committee of parents, for example, to code a program for a class of students in the least objectionable way.

Instead of designating whether scenes contain objectionable materials, content codes can be selected based on various other criteria. For example, all the scenes of a documentary program may be selected if they show animals.

Figure 5:
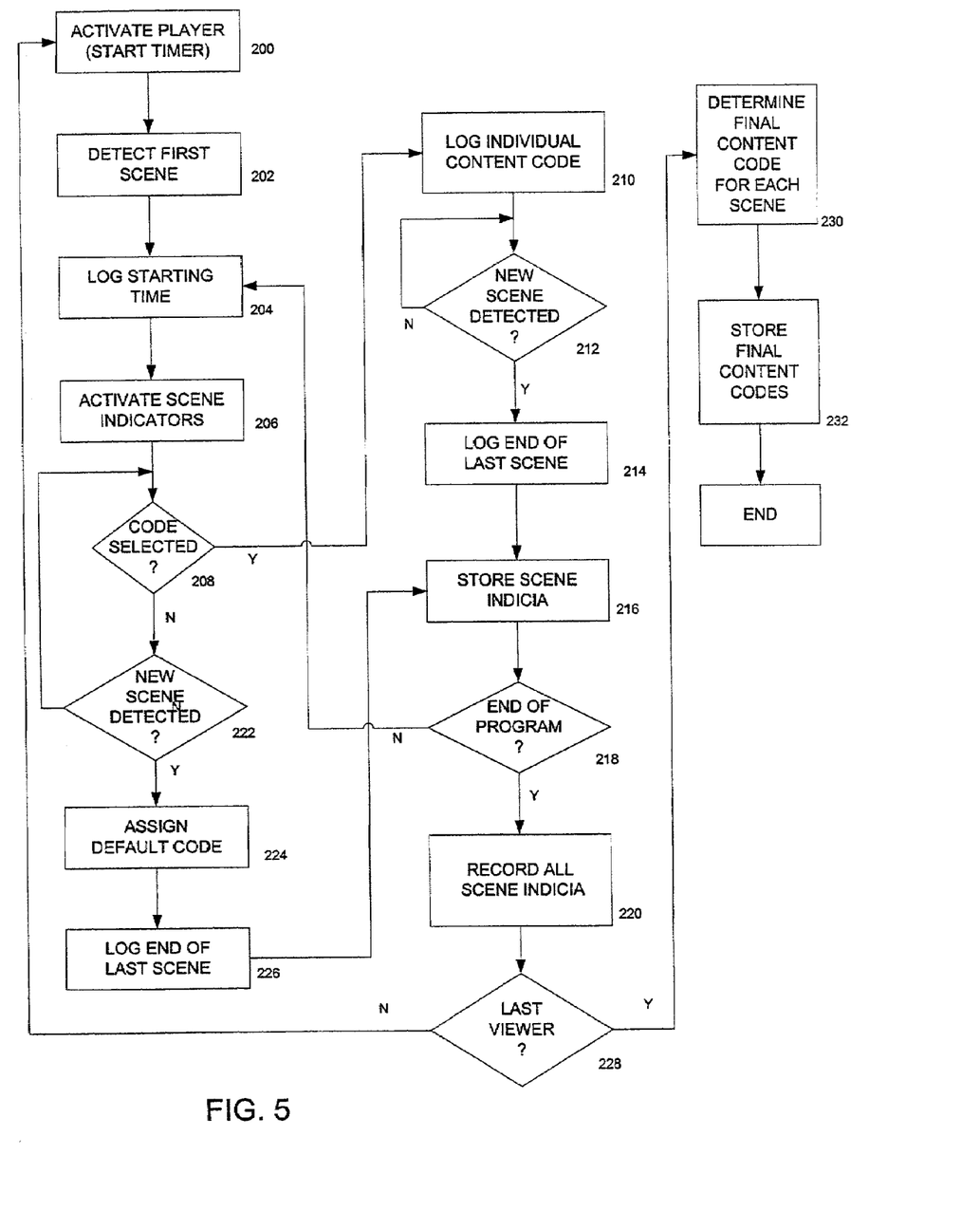
FIG. 5 shows a flow chart for generating content codes by several viewers using the apparatus of FIG. 4.

In another embodiment of the invention, even the apparatus of FIG. 1 with only one call selector can be used to obtain a group consensus. The viewers use the same apparatus individually, at different times. As shown in FIG. 5 for this mode of operation, each viewer selects an individual content code which is logged in the same manner as described above. Thus steps 200–226 are similar to corresponding steps 100–126 of FIG. 4. However, in this embodiment after the program is completely played for one viewer and the scene indicia are recorded (step 220), a check is performed in step 228 to determine if the viewer who has just coded the program is the last viewer. This check may be accomplished in a number of different ways. For example, when the program is played the first time, the controller 22 can be provided with the number of viewers that will review the program. Alternatively, a special control signal may be provided to the controller 22 when the last viewer has coded the program.

Next, in step 230 the final content code for each scene is determined based on the individual content codes. In step 232, the final content codes are then stored.

By generating a content code for each scene of a program, a table is created which associates each scene with its content code and the address of the next scene. This table may be stored separately or may be attached to the program itself. The table can be used to control the manner in which the program is played. For example, co-pending commonly assigned U.S. application Ser. No. 09/479,819 filed Jan. 7, 2000, entitled CONTENT CONTROL OF BROADCAST PROGRAMS and incorporated herein by reference discloses a method and apparatus wherein a program is broadcast together with its table to a customer with an appropriately configured personal video recorder. The customer selects an acceptable content code. The personal video recorder then can record and play only the scenes that have a predetermined content code, while skipping the scenes with other codes. Since the table with the content codes is received in advance, the personal recorder can determine the scenes that are to be skipped, and the duration of these skipped scenes. The recorder therefore can delay playing the program by the duration of the skipped scenes so that the program can be played without interruption.

Another advantage of providing a program with a table of scene-associated content codes is that it allows a content provider to create a program with several interchangeable scenes, each scene having a unique content code. A customer may then elect to get a program with all the scenes. Alternatively, a customer may elect to a version of the program with all the scenes having a predetermined content code or codes.

Obviously, numerous other modifications can be made to this invention without departing from its scope, as defined in the appended claims.

I claim:

1. An apparatus for allowing several viewers to assign content codes to scenes in an audiovisual program comprising:

a device for playing the program and provided with a scene indicator to identify a new scene;

a content selector having several viewer inputs for generating respective individual content codes for a scene;

a memory for storing content codes associated with respective scenes; and a control circuit adapted to generate a final control code for the respective scenes in accordance with said individual content codes.

2. The apparatus of claim 1 wherein said memory stores data relating to the beginnings and endings of scenes together with respective content codes.

3. The apparatus of claim 2 further comprising a scene indicator that is activated when a new scene is played.

4. The apparatus of claim 3 wherein said scene indicator is deactivated after a content code for the scene is generated.

5. The apparatus of claim 3 further comprising a plurality of respective scene indicators, each scene indicator being associated with one of said viewer inputs.

6. The apparatus of claim 3 further including a scene detector for automatically activating said scene indicator.

7. The apparatus of claim 3 further including a manually operated switch for activating said scene indicator.

8. The apparatus of claim 1 further comprising a scene indicator that is activated when a new scene is played.

9. The apparatus of claim 1 wherein said scene indicator is deactivated after a content code for the scene is generated.

10. The apparatus of claim 8 further including a scene detector for automatically activating said scene indicator.

11. The apparatus of claim 8 further including a manually operated switch for activating said scene indicator.

12. The apparatus of claim 8 wherein said scene indicator is activated for a predetermined time.

13. The apparatus of claim 8 further comprising a scene timer adapted to indicate the time left to the end of the scene.

14. A viewer-operated apparatus for generating content codes for individual scenes of an audiovisual program based on inputs of several viewers, said apparatus comprising:
a player to present said program;
a scene detector coupled to said player to detect presentation of a new scene by said player;
a plurality of content selectors each having a viewer control for inputting a content code for the scene being presented; and
a controller to receive content codes from said plurality of content selectors and to generate a single content code based thereon.

15. The apparatus of claim 14 further comprising a memory for storing said single content codes.

16. The apparatus of claim 15 wherein said memory stores data relating to the beginnings and endings of scenes together with respective content codes.

17. The apparatus of claim 16 further comprising a scene indicator that is activated when a new scene is played.

18. The apparatus of claim 17 wherein said scene indicator is deactivated after a content code for the scene is generated.

19. The apparatus of claim 17 further including a scene detector for automatically activating said scene indicator.

20. The apparatus of claim 17 further including a manually operated switch for activating said scene indicator.

21. The apparatus of claim 15 further comprising a scene indicator that is activated when a new scene is played.

22. The apparatus of claim 21 wherein said scene indicator is deactivated after a content code for the scene is generated.

23. The apparatus of claim 21 further including a scene detector for automatically activating said scene indicator.

24. The apparatus of claim 21 wherein said scene indictor is activated for a predetermined time period.

25. The apparatus of claim 21 further including a manually operated switch for activating said scene indicator.

26. The apparatus of claim 15 further comprising a plurality of scene indicators that are activated when a new scene is played.

27. The apparatus of claim 26 wherein each said scene indicator is associated with a corresponding control selector.

28. The apparatus of claim 26 wherein each said plurality of scene indicators is deactivated when a viewer designates an individual content code for a scene.

29. The apparatus of claim 26 wherein each said plurality of scene indicators is deactivated when a viewer fails to designate an individual content code by the end of a respective scene.

30. The apparatus of claim 17 further comprising an end of scene detector adapted to detect the end of a scene.

31. The apparatus of claim 30 further comprising a default value selector adapted to select a default value for the respective individual content code if the respective viewer fails to select an individual content code.

32. The apparatus of claim 17 further comprising a default value selector adapted to select a default value for the respective individual content code if the respective viewer fails to select an individual content code.

33. An apparatus for generating content codes for a program formed of a sequence of scenes comprising:
a device adapted to play said program in sequence for an audiovisual monitoring system;
a scene detector coupled to said player and adapted to detect a starting point for each of said scenes being played by said player;
a scene indicator that is activated when a scene requiring content code is detected; and selector means having viewer inputs to receive from a plurality of viewers a respective individual preference associated with the scene detected by said scene detector and to assign said content code corresponding to said individual preference.

34. The apparatus of claim 33 wherein said player is adapted to play one of a video tape, a DVD disk and a broadcast program.

35. The apparatus of claim 34 wherein said player is adapted to play said broadcast program, further comprising a receiver to receive said broadcast program.

36. The apparatus of claim 33 wherein said program includes scene identification codes identifying the starting points of the scenes, wherein said scene detector is adapted to detect said scene identification codes.

37. The apparatus of claim 33 further comprising an identification generator adapted to generate an identification that identifies said scene.

38. The apparatus of claim 33 wherein said scene detector includes a scene selector adapted to be activated by the viewer to indicate the starting point of said scene.

39. The apparatus of claim 33 further comprising a controller adapted to determine if said selector fails to provide said content code, said controller being adapted to generate in this case a default content code for said scene.

40. The apparatus of claim 33 wherein said scene indicator is deactivated when a content code is assigned to the corresponding scene.

41. A method of generating content codes for the sequential scenes of a program comprising:
displaying said program to a plurality of viewers;
identifying a scene of said program;
obtaining an individual preference of each said viewer regarding said scene;

generating a content code dependent on said individual preferences; and storing said content code into a memory.

42. The method of claim 41 further comprising storing data relating the beginnings and endings of scenes together with said content codes into said memory.

43. The method of claim 41 further comprising activating a scene indication when a new scene is detected.

44. The method of claim 43 further comprising deactivating said scene indication after said content code is generated.

45. The method of claim 44 further comprising assigning a default value for the respective individual preference if no individual preference was selected by said viewer.

46. The method of claim 43 further comprising detecting an end of a current scene and deactivating said scene indication at the end of said current scene.

47. The method of claim 44 wherein said detecting each new scene and automatically generating said scene indication after the new scene is detected.

48. The method of claim 41 wherein new scenes are detected automatically by a scene detector.

49. The method of claim 41 wherein new scenes are detected by a viewer and wherein said scene indicator is activated by a manual switch operated by the viewer.

50. The method of claim 49 further comprising storing data related to the beginnings and endings of said scenes.

51. The method of claim 50 wherein further comprising generating timing signals indicative of said beginnings and endings.

52. The method of claim 41 further comprising displaying the program to a plurality of viewers, obtaining a content code from each viewer, and generating a single content code based thereon.

53. The method of claim 41 wherein if the scene is played by said player before the viewer chooses a respective content code and a default content code is assigned to said scene if the viewer does not choose a content code for the scene.

54. The method of claim 41 further comprising displaying said program to the viewers simultaneously to allow said viewers to select the content codes at the same time.

55. The method of claim 41 further comprising displaying said program to viewers sequentially.

* * * * *